United States Patent

Caron et al.

[11] Patent Number: 6,108,661
[45] Date of Patent: *Aug. 22, 2000

[54] SYSTEM FOR INSTANCE CUSTOMIZATION

[75] Inventors: Ilan Caron, Seattle; Alan W. Carter, Bellevue; Satish Kumar Chittamuru, Issaquah; Rajiv Kumar, Redmond; Scott Michael Wiltamuth, Seattle, all of Wash.

[73] Assignee: Microsoft Corporation, Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/890,367

[22] Filed: Jul. 14, 1997

[51] Int. Cl.⁷ .................................................... G06F 17/30
[52] U.S. Cl. ........................ 707/102; 707/104; 707/103; 707/10
[58] Field of Search ............................ 707/10, 103, 104; 345/326, 335, 352; 395/202, 602, 335, 683, 863, 701

[56] References Cited

U.S. PATENT DOCUMENTS

| | | | |
|---|---|---|---|
| 5,421,012 | 5/1995 | Khoyi et al. | |
| 5,542,039 | 7/1996 | Brinson. | |
| 5,544,285 | 8/1996 | Glaser et al. | 395/149 |
| 5,560,005 | 9/1996 | Hoover et al. | 707/10 |
| 5,602,997 | 2/1997 | Carpenter | 395/349 |
| 5,630,125 | 5/1997 | Zellweger | 707/103 |
| 5,649,192 | 7/1997 | Stucky | 707/103 |
| 5,659,740 | 8/1997 | Ezaki et al. | 707/103 |
| 5,680,524 | 10/1997 | Maples et al. | 395/127 |
| 5,680,559 | 10/1997 | Chew et al. | 395/335 |
| 5,689,662 | 11/1997 | Nakajima et al. | 345/326 |
| 5,710,925 | 1/1998 | Leach et al. | 395/683 |
| 5,736,983 | 4/1998 | Nakajima et al. | 345/335 |
| 5,748,907 | 5/1998 | Crane | 395/202 |
| 5,752,018 | 5/1998 | Sheffield | 395/602 |
| 5,819,283 | 10/1998 | Turkowski | 707/103 |
| 5,852,441 | 12/1998 | Nakajima et al. | 345/352 |
| 5,873,069 | 2/1999 | Reuhl et al. | 705/20 |
| 5,884,097 | 3/1999 | Li et al. | 395/863 |
| 5,903,905 | 5/1999 | Andersen et al. | 707/526 |
| 5,905,987 | 5/1999 | Shutt et al. | 707/103 |
| 5,914,720 | 6/1999 | Maples et al. | 345/419 |
| 5,915,252 | 6/1999 | Misheski et al. | 707/103 |
| 5,915,253 | 6/1999 | Christiansen | 707/103 |
| 5,936,860 | 8/1999 | Arnold et al. | 364/468.01 |
| 5,937,189 | 8/1999 | Branson et al. | 395/701 |
| 5,970,498 | 10/1999 | Duffield et al. | 707/104 |

Primary Examiner—Wayne Amsbury
Assistant Examiner—Thuy Pardo
Attorney, Agent, or Firm—Leydig, Voit & Mayer, Ltd.

[57] ABSTRACT

The system for instance customization functions to place code behind documents in a multi-program environment in a manner that eliminates the object instance management problems of existing systems. The system for instance customization consists of the process whereby the behavior of an object is changed by the user without changing its identity. In particular, the system for instance customization combines a customizable object and a language engine object to form the customized instance of the object. Instance customization is enabled by the customized object aggregating the user defined customizations into a standard object that is supplied by Visual Basic. The Visual Basic object is given a pointer to the standard part of the document object which implements the base functionality of the document.

16 Claims, 4 Drawing Sheets

SYSTEM FOR INSTANCE CUSTOMIZATION

CROSS-REFERENCE TO RELATED APPLICATIONS

This application is related to the co-pending U.S. patent application Ser. No. 08/892,684 titled "System for Instance Customization and Application Independent Programming of Controls" filed on Jul. 14, 1997 now pending and the U.S. patent application Ser. No. 08/890,634 titled "System for Application Independent Programming of Controls" filed on Jul. 14, 1997 now pending.

FIELD OF THE INVENTION

This invention relates to processors that have a plurality of application programs installed thereon, each of which has its own internally defined set of objects. The system for instance customization functions to provide the capability for a user to change an object's behavior within an instance of the object in an application program without changing the object's identity and without impacting other users who have their own instances of the object.

PROBLEM

It is a problem in application programs to manage customized instances of objects. This problem is especially relevant in an office suite type of environment on a personal computer, where each application program in the office suite can embed objects into an extended object, which is implemented in the application program, to modify the properties, methods and events of the embedded objects. This creation of customized objects by embedding objects in the application program causes difficulty in maintaining consistency of reference when multiple users concurrently access the object and make changes to the object. This is especially problematic when the reference to the object spans multiple application programs.

As an illustration, the Microsoft Office suite of application programs comprises a Visual Basic for Applications (also termed Visual Basic) layer on which is overlaid a plurality of application programs, including: PowerPoint, Word, and Excel. Early versions of Visual Basic put code behind objects, such as forms, using a class customization model, in which the identity of the object changes during the transition from design-time to run-time. This model works for Visual Basic but does not work for the Microsoft Office environment of application programs. If Microsoft Office were to use a class customization model, then the Object Linking and Embedding (OLE) object identity of an Excel spreadsheet, Word document, etc. would change when major changes were made to the code behind the spreadsheet or document. The problem with this is that any clients who were holding onto an instance pointer of the spreadsheet or document would end up with an invalid pointer, since the underlying object that was pointed to no longer exists. A user would then have to take whatever action is necessary in order to refresh the instance pointer in every instance it is used in each application program to now point to the new instantiation of the object. Thus, an apparently benign action, such as adding a table to a Word document, can cause the interface of the Word document to change, since a property may be added to the Word document for accessing the table.

Since the document-based world is inherently instance-based, having the object authoring model be class-based rather than instance-based causes object management problems. It is not possible for a class-based model to address all of the user scenarios that can occur and ensure that each instance of the customized object remains valid.

SOLUTION

The present system for instance customization functions to place code behind documents in a multi-program environment in a manner that eliminates the object instance management problems of existing systems. The system for instance customization consists of the process whereby the behavior of an object is changed by the user without changing its identity. In particular, the system for instance customization combines a customizable object and a language engine object to form the customized instance of the object. Instance customization is enabled by the customized object aggregating the user defined customizations into a standard object that is supplied by Visual Basic. The Visual Basic object is given a pointer to the standard part of the document object which implements the base functionality of the document.

As an example, some users of Microsoft Office application programs implement customized objects by using Visual Basic directly, while many users use Visual Basic indirectly through the wizards or tools that are provided in the application programs. An instance-based programming model of objects is therefore easier for these users to understand since this is the paradigm implemented in the indirect case. For example, a user places a control on a document and writes event handling code for it. The programming model that the user sees is like Visual Basic, in that the control is accessible as a property on the control container. The system for instance customization enables clients to hold a pointer to the document object and the user programmed control, without it becoming invalidated. Another example is where an Excel workbook is embedded in a Visio drawing. A user places a button on the document and writes event handling code for the button. Instance customization is required for this scenario because the embedding protocol assumes that the identity of an embedding is constant. This protocol and others that make similar assumptions cannot be changed because they are an integral part of the application programs. All containers of the object would therefore have to use the new protocol. In addition, all containees of the object, such as controls, would have to use the new protocol since it is possible for a containee to obtain a pointer to its container. The only possible way out of this would be to say that the object being customized by the user has a different identity from the embedded object. In other words, there are two parallel worlds—one for internal consumption and one for external consumption, which is an unacceptable limitation.

DETAILED DESCRIPTION

Figure 1:
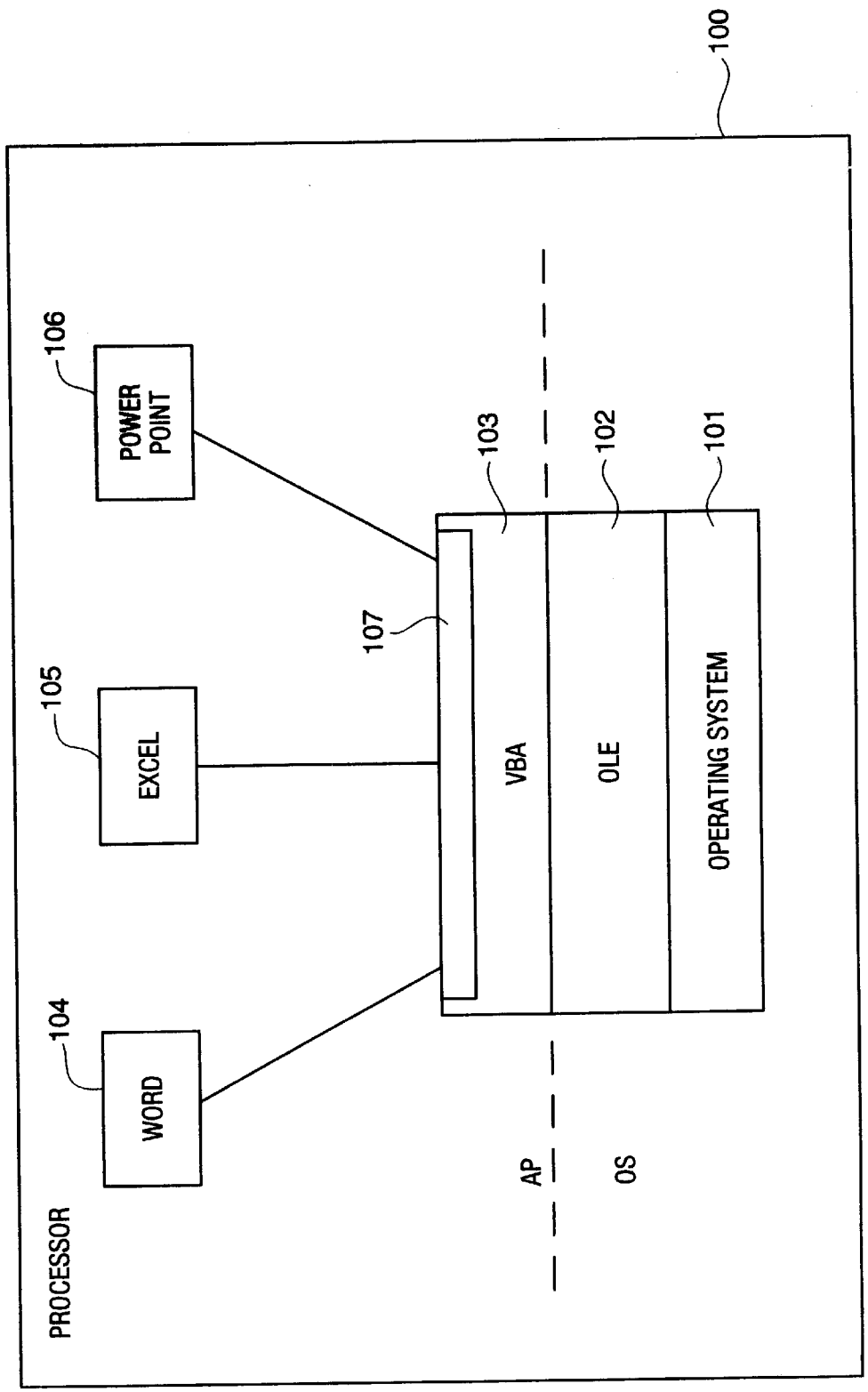
FIG. 1 illustrates in block diagram form the program hierarchy installed in a typical processor.

The system for instance customization functions to place code behind documents in a manner that eliminates the instance management problems of existing systems. The system for instance customization consists of the process whereby the behavior of an object is changed by the user without changing its identity. In particular, the system for instance customization combines a customizable object and a language engine object to form the customized instance of the object. Instance customization is enabled by the customized object aggregating the user defined customizations into a standard object that is supplied by Visual Basic. The Visual Basic object is given a pointer to the standard part of the document object which implements the base functionality of the document.

Examples of the Problem

The basic problem outlined above can be appreciated by reviewing several instances where the problem appears in the application program environment. A first example is the case where the user embeds a customized object within a document and the container code accesses the embedding. Such an instance is where a user customizes a compound document: an Excel worksheet embedded in a Word document. The user writes code in the Word document that manipulates the Excel worksheet, such as code that accesses controls in the worksheet. An example of such code in the Word document is to insert a button that displays a text output when it is activated:

Sub Button1_Click()
  Sheet1.Caption="Hello"
End Sub

The user clicks the "Run" button in Visual Basic to compile the newly written code. The user tests the code by clicking and then clicks the Button1 button on the document, and then moves on to do some other work. When the user later edits the worksheet by placing new controls in the worksheet, the user expects the code previously inserted in the document to continue working without a change or a reset. It is possible for the worksheet and the document to cooperate so that the worksheet can change its identity, but this requires changing the embedding protocol, which is unacceptable. Even if it were acceptable to change the embedding protocol, the coordination could not be fully enabled since the document would be required to do a "reset", thus causing loss of state. A reset is required because it is possible for the developer to have references to the "old" worksheet that existed prior to the insertion of the second set of code. If a reset occurs, then these references to the old worksheet are no longer valid, unless the user locates all references to the old sheet and updates these references.

A second example of the problem is where a user creates a Microsoft Office binder to combine a Word document and an Excel workbook. The user writes code in the binder that receives change notifications from the workbook and propagates changes as necessary to the Word document. Code exists in the Word document, in the workbook and in the binder. In this environment, there are many ways to obtain an object reference, and these cannot be efficiently managed. In particular, it cannot be assumed that all users in the application environment who hold object references support change notifications. Therefore, object references cannot be changed consistently and yet the functionality cannot be disabled because a down-level client holds an object reference.

Definitions

The following list of definitions provides a baseline characterization of a number of the descriptive terms used herein:

1. Type information includes a description of everything a client needs to know to use the services that are provided by an object. In addition, for each interface that an object supports, the object's type information includes a list of the methods and properties associated with the interface, along with a description of the parameters for those methods. A type library therefore comprises a collection of type information which represents a set of standardized descriptions of object interfaces.

2. Embedding is the function whereby information, such as a chart or an equation or spreadsheet data, is inserted in a document active in another application program, such as a Word document. Once embedded, the information, termed an object, becomes part of the Word document. When a user selects an embedded Word object, the CPU opens the application program in which the object was created and the object is displayed and ready for editing.

3. Container—When information from two separate pieces of software are combined in a compound document, one piece of software acts as the container and the other acts as the server. OLE allows a server to either embed its data in the container or link its data to the container. Embedding means that the server's data is stored in the same file as the containers data. With linking, the server's data remains in its own file and only a reference to that data is stored in the container's file.

4. Containment/Aggregation—Containment comprises enclosing an object within another so that the inner object is used by the outer object exactly as any other client would use the inner object. Aggregation simply exposes a number of the inner objects' interfaces without requiring any intervening interfaces. For example, a control does not maintain properties and support methods that are relevant only to the container. For the container to package its own custom properties and methods in a control, so these properties and methods appear to be native to the control itself, an extended control must be created. The extended control is a partial control that wraps around another control through containment and aggregation to supply the extended functionality that the control itself knows nothing about. Thus, the container provides its own extended control implementation that overrides specific interfaces on the control through containment and exposes the remaining interfaces through aggregation.

5. Control—A control is a user interface that transforms an external event, such as a mouse click, keystroke, telephone call, and the like, into a meaningful programmatic event. At the occurrence of a programmatic event, an event handler in a control container executes code, a command, or activates some element associated with the CPU. A control can also have no events and function to expose properties and methods. Thus, a control is a collection of functionality and content that is self-contained in that the control is independent of the application program in which it resides.

6. Event—An event is a mechanism that is used to extend and modify a control's behavior. An event is a stimulus which triggers the execution of event specific code and/or a mechanism through which the control notifies the container of events that occur within the control.

Software Architecture

FIG. 1 illustrates a typical software architecture 100 for a standard computer system, such as a personal computer, which architecture 100 includes the system for application independent programming of controls 107 of the present invention. As an illustration, the Microsoft Office suite comprises a Visual Basic layer 103 on which is overlaid a plurality of application programs, including: PowerPoint 106, Word 104, and Excel 105. The dotted line drawn horizontally across the middle of FIG. 1 illustrates the conceptual distinction between what is traditionally termed the operating system (OS) and what is traditionally termed the application program (AP) environment. The system for application independent programming of controls 107 is part of the Visual Basic layer 103. The Visual Basic layer 103 interconnects with an Object Linking and Embedding (OLE) layer 102 which is interposed between the Visual Basic layer 103 and the host operating system 101.

The application programs 104–106 use the system for application independent programming of controls 107 to offer a controls interface which enables each of the application programs 104–106 to provide a common programming model for controls which are maintained in the Visual Basic layer 103. Each user of the application programs 104–106 can access the common set of controls and thence customize a control for use in a selected one of the application programs. The customization of the control is implemented when the user designs a control in the selected application program and the application program calls the controls interface (system for application independent programming of controls 107) of the Visual Basic layer 103 which produces a type library entry to describe the properties, methods and events of the extended control that the user has created. The application program maintains a type description extender library, wherein an extender is an object which implements the extender properties and methods supplied by the application program, such as Top, Left, height and the like. A pointer to the extender entry is returned from the application program to the system for application independent programming of controls 107 as an output parameter to link the standard control in Visual Basic 103 and its customization definition as maintained in the application program. The type definitions of extenders are part of the application program's standard library.

Object Programmability in Existing Application Programs

For objects in application programs to be programmable, they must be capable of being driven not only by the users, but also by other application programs. Since various application programs use different languages for implementation, there must be a standard manner in which the programs can interact. This interaction is enabled by the COM objects used by application programs. Application programs allow access to their services through the interfaces exposed by their COM objects. Any piece of software that can invoke a method exposed by a COM object can use the services of the embedded application program. However, the COM interface is typically implemented using a vtable which is a table of pointers to functions. To access an underlying service, the invoking application must traverse the table of pointers to locate the desired pointer, then pass the necessary parameters across this interface in the proper format. To overcome this inherent complexity, the IDispatch interface is used to expose an application program's internal functions to other software. IDispatch is a standard COM interface, but includes a function termed "Invoke" that can be used to invoke other functions. Thus, the developer in implementing IDispatch, specifies what methods are available to be invoked by defining a dispatch interface, termed "dispinterface" which provides a simple identifier listing of methods. The selected method is called by simply passing the method identification in the dispinterface.

Every interface in an object inherits from IUnknown, and therefore the first three pointers in an interface point to IUnknown's three methods: QueryInterface, AddRef, Release. When a client invokes a method in an interface, the structure of pointers in the interface is traversed until the correct pointer is located. The pointer to the vtable leads to the pointer for the desired method, which in turn leads to the code that provides the desired service. The QueryInterface method of IUnknown enables the user to request identification data from the process itself to locate the proper interface. The object then returns the proper pointer to the desired interface. When a user desires to change features defined in an object, the existing interfaces can not be changed and a new interface must be added to address the newly added functionality. A running object remains in existence until it is no longer needed. To avoid the problem of an object being closed while some application is still referencing the object, the object implements reference counting. Whenever the object passes out a pointer to one of its interfaces in response to a call to the AddRef method of the IUnknown interface, it adds a count of 1 to the reference count. When the access is completed, the client must call the Release method of the IUnknown interface to thereby reduce the reference count and ensure that the object is maintained for only the presently active clients. Once the reference count reaches 0, the object can be closed/destroyed, since there are presently no clients being served.

To interact with a client, an object must support at least one outgoing interface. In the instance of this interface, the object acts as a client. To qualify as a connectable object, the object must support an interface termed "IConnectionPointContainer". This interface identifies to the clients which outgoing interfaces are supported by the object. Each of these outgoing interfaces is represented by a separate connection point object within the IConnectionPointContainer interface. The client's implementation of the interface that connects to a desired one of the connection point objects is termed a sink.

Instance Customization Architecture

Given this environment, the system for instance customization functions to put code behind application program documents to enable users to customize instances of objects that appear in an application program. Instance customization is enabled by the customized object aggregating the code provided by a user in a customizable object that is supplied by the Visual Basic layer 103. The Visual Basic object is given a pointer as part of the definition of the customized document object and comprises the element which implements the "base" functionality of the document object. Instance customization therefore seeks to combine a customizable object (termed "Extensible Object" herein) and a language engine object to form the customized instance.

Figure 2:
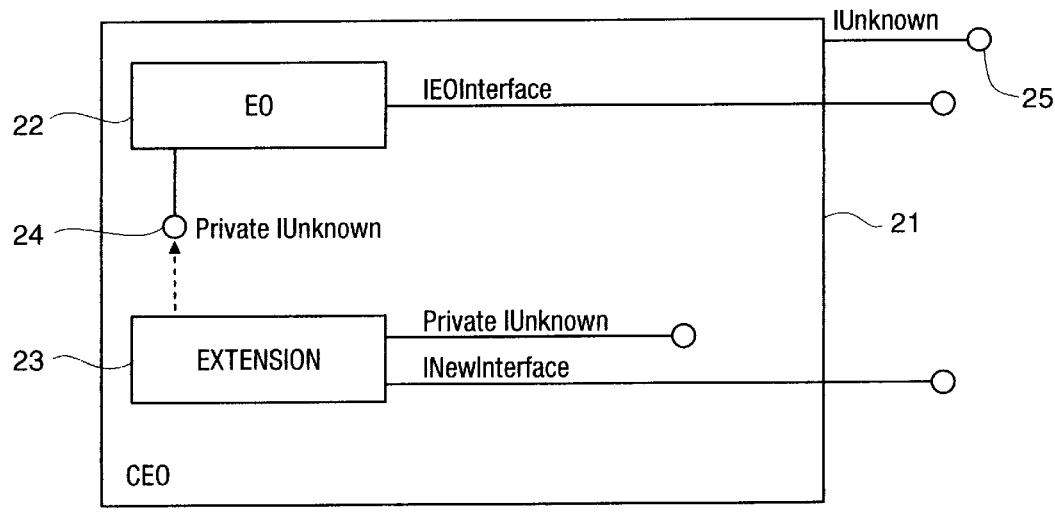
FIG. 2 illustrate the interrelation of the various elements contained within an extended object in the present system for instance customization.

This customization is accomplished by the elements shown in FIG. 2, wherein an Extensible Object (EO) 22 is an object provided by the Visual Basic layer 103 that can be extended by an Extension 23. The Extension 23 may add behavior to the Extensible Object 22 by handling its events, by adding new interfaces, or by adding new members and events. The user can therefore change an Extensible Object's behavior or even create a new type of object that is based upon the original Extensible Object, using this paradigm. The Controlling Extensible Object (CEO) 21 becomes the controlling unknown, wherein the Controlling Extensible Object 21 is the IUnknown implementation of the object that controls the QueryInterface behavior, that is, it controls what interfaces are exposed by the object for the Extensible Object 22 that is customized.

FIG. 2 illustrates how the Controlling Extensible Object 21, Extensible Object 22, and Extension 23 relate to one another. The Extensible Object 22 and the Extension 23 are aggregated into the Controlling Extensible Object 21. The Extension 23 holds a Private IUnknown pointer 24 to the Extensible Object 22. A requirem a ControllingExtensible Object 21 is that it implement the interface IUnknown 25 as an external interface so that it can be directly accessed. The Controlling Extensible Object 21 implements the controlling unknown. As such, the Controlling Extensible Object 21 is responsible for dynamically exposing interfaces that are added to the Extensible Object 22 by the Extension 23. The Controlling Extensible Object 21 may do this by forwarding the Query Interface request to the Extension 23 when an unrecognized interface is requested. The Controlling Extensible Object 21 must also expose several interfaces defined on the Extension 23 by delegating Query Interface requests for these interfaces to the Extension 23. These interfaces are:

IDispatch.

IConnectionPointContainer.

the default interface for the object.

The following table lists these interfaces and the corresponding functions or behaviors that are implemented by access to these interfaces:

| Behavior | Which Extensible Objects support their behavior | Related Interfaces |
| --- | --- | --- |
| Implement Private Unknown | All | IUnknown |
| Exposed properties and methods | Extension Objects that have properties and methods | IDispatch |
| Expose events | Extensible Objects that have events | ICPContainer IConnectionPoint |

Implement Private Unknown

Figure 3:
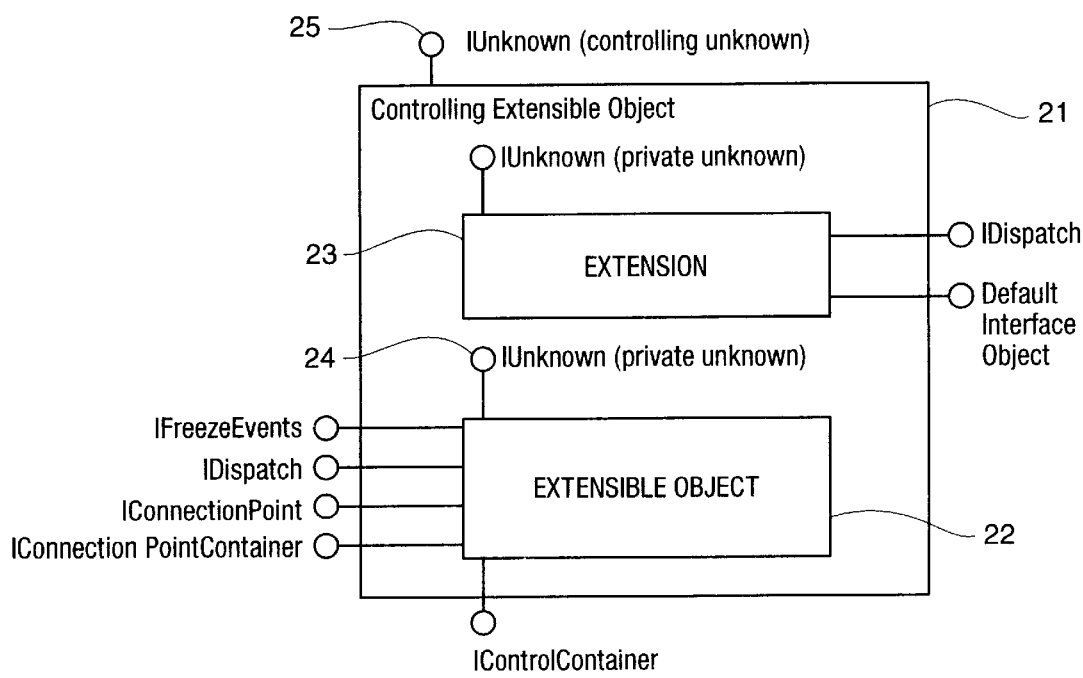
FIG. 3 illustrates the interrelation between the various elements contained within an extended object to expose the object's internal interface.

The operational rules for Extensible Object 22 are illustrated diagrammatically in FIG. 3. The Controlling Extensible Object 21 implements the controlling unknown for an aggregate of the Extensible Object 22 and the Extension 23 which comprise the Controlling Extensible Object 21. Each part of the aggregate has specific IUnknown::QueryInterface rules it must support beyond the usual Component Object Model (COM) rules for aggregators and aggregatees. These specific interfaces (rules) are illustrated in FIG. 3. The Controlling Extensible Object 21 implements the controlling unknown and is responsible for dynamically exposing the interfaces that are added to Extensible Object 22 by the Extension 23. The Controlling Extensible Object 21 must forward QueryInterface requests to the Extension 23 when an unrecognized interface is requested. The Extensible Object 22 indicates what interfaces it exposes by its support for IProvideClassInfo on the Extensible Object Design object. The Extensible Object 22 must implement at least a private unknown, which is used by the Extension 23 to query the interface for functionality supplied directly by the Extensible Object 22. The Extensible Object 22 exposes properties and methods by use of a dual interface, which is an interface whose methods can be accessed either directly through the interface's vtable or via IDispatch::Invoke, since all dual interfaces derive from IDispatch. The Extension interface that is tagged as the default in the provided type information defines the programmability interface. As with all aggregatees, the default interface must be accessible via the private unknown of the Extensible Object 22.

The DocumentSite object associated with the Extensible Object 22 provides IProvideClassInfo. An Extensible Object 22 that has events exposes them by supporting IConnectionPointContainer and one or more connection points. Because the Extension 23 owns the IConnectionPointContainer exposed by the Controlling Extensible Object 21, it can add a new interface to the combined object at any time by making them appear in the IConnectionPointContainer. Because the Controlling Extensible Object 21 forwards QueryInterface to the Extension 23, the Extension 23 can add a new interface to the combined object at any time. The new interface is marked as the default in the dynamic type information. Object extensions makes no attempt to define categories of events or standard event firing behavior in the context of multiple connected parties. When someone calls IConnectionPoint::Advise for an Extension-created connection point, the Extension actually connects the sink to both the new connection point and the original one. In this way, events that are fired by the Extensible Object 22 and new events that are introduced by the Extension 23 are all passed to the event sink which is handling events for the extended event interface. When a sink later disconnects by calling IConnectionPoint::Unadvise, the Extension disconnects the sink from the new connection point and from the old one.

All Extensible Objects 22 provide type information by supporting IProvideClassInfo. Type information is used by some Extensions 23 to generate event stubs and to sink the Extensible Objects events. The GetTypeInfo member returns a TKIND_COCLASS ITypeInfo which describes the set of interfaces that the object supports as given by the code:

```
interface IProvideClassInfo : IUnknown
{
    HRESULT GetTypeInfo_xe "GetTypeInfo"_(ITypeInfo
**pptinfo);
}
```

IProvideClassInfo::GetTypeInfo returns the static typeinfo for the object. This typeinfo specifies the set of interfaces that the object supports for its entire lifetime. In other words, it returns the same type description for an object, regardless of any instance modifications that might have been made to it.

Describing the Extensible Object and its Fixed Subobjects

The Extensible Object 22 is described with a COCLASS Typeinfo. This describes the static part of the Extensible Object 22: the part that never changes. The goal of the system for instance customization is to describe the Extensible Object 22 and its fixed sub-parts in enough detail for the Extension 23 to expose all of the functionality, and enable users to extend the functionality, such as by writing event handlers or adding properties, methods and events. Since the static type information of the object is being described, it is possible to use OLE Automation's MkTypLib.Exe tool to build a type library containing the required type info instances. As an example of this capability, the coclass description for a Word document with one property (Length), one method (InsertTable), one event (Repaginate), and one fixed sub-part (Header) is shown herein as an example:

```
// Definition of Header
//
    [dual, hidden]
    interface IHeader
    {
        [propget] HRESULT Text([retval] BSTR *Value);
        [propput] HRESULT Text(BSTR Value);
    }
    [oacompatible, hidden]
    interface EHeader
    {
        HRESULT Changed( );
    }
    coclass Header
    {
        [default] IHeader;
        [default, source] EHeader;
    }
// Definition of Document
//
    [dual, hidden]
    interface IDocument
    {
        [propget, source] HRESULT Header ([retval] Header **Value);
        [propget] HRESULT Length([retval] long *Value);
        HRESULT InsertTable(integer NumRows, integer NumColumns);
    }
    [oacompatible, hidden]
    interface EDocument
    {
        HRESULT Repaginate( );
    }
    coclass Document
    {
        [default] IDocument;
        [default, source] EDocument;
    }
```

Note that the Header property in IDocument is tagged as a source property to indicate that it is an object-valued property that is a source of events.

Properties of Extension for Instance Customization

All Extensions 23 support aggregation, and implement a set of interfaces that describe the object as a whole, including IDispatch and ProvideClassinfo. Some Extensions 23 change the type of the object; others do not. An Extension 23 that only enables a developer to handle events does not change the type of the object. In general, the Extension 23 can change the type of the Controlling Extensible Object 21 by:

Adding properties, methods and events to the default programmability interfaces.

Removing properties, methods and events from the default programmability interfaces.

Adding and tombstoning interfaces.

Adding and tombstoning source interfaces.

Extension behaviors are listed in the table below:

| Behavior | Which Extensions | Related Interfaces |
|---|---|---|
| Support Aggregation | All | |
| Provide Type information | All | IProvideClassInfo |
| Implement Idispatch | All | IDispatch |
| Implement ICPContainer | Extensions that add events | ICPContainer |
| Implement the EO default interface | Extensions that support overriding properties and methods | |

Extensible Object and the Extension

An Extension 23 adds properties, methods and events to an Extensible Object 22. In order to make this possible, the Extension 23 implements IDispatch and IConnectionPointContainer so that the Extension 23 can later change the behavior of these interfaces. Extensions 23 that support the overriding capability need to implement the Extensible Objects 22 default interface and delegate to the implementation of the interface on the Extensible Object 22. This is required so that if the user performs an override, existing pointers to the default interface continue to work. The Extension 23 may alter the type of the object it is extending. This section describes how the Extension 23 alters the type of the object. In order to extend the default programmability interface of the Extensible Object 22, the Extension 23 exposes a new interface. The new interface is marked as the default in type information if it is exposed by the Extension 23. In order to be the extension of the original interface, this new interface must support the members of the Extensible Object's default programmability interface by delegating to the Extensible Object 22. The new interface is returned when the Extension 23 receives a Query Interface request for IDispatch or a QueryInterface for the default interface of the Extensible Object 22.

Code Behind Objects and Documents

The system for instance customization supports the concept of code behind objects and documents. In this manifestation of the present system of instance customization, the code is a module of Visual Basic and all modules are contained within a project. There is one project per storage and each object that has code behind it has its code contained within a separate module within the project. This is a mechanism to sink events for a particular object. There is a code module associated with a document project item or other project item. Only that code module sees the events for the document project item. Event handlers for the controls on the document project item can be written in the module associated with the project.

Creating and Setting the Extension

Figure 5:
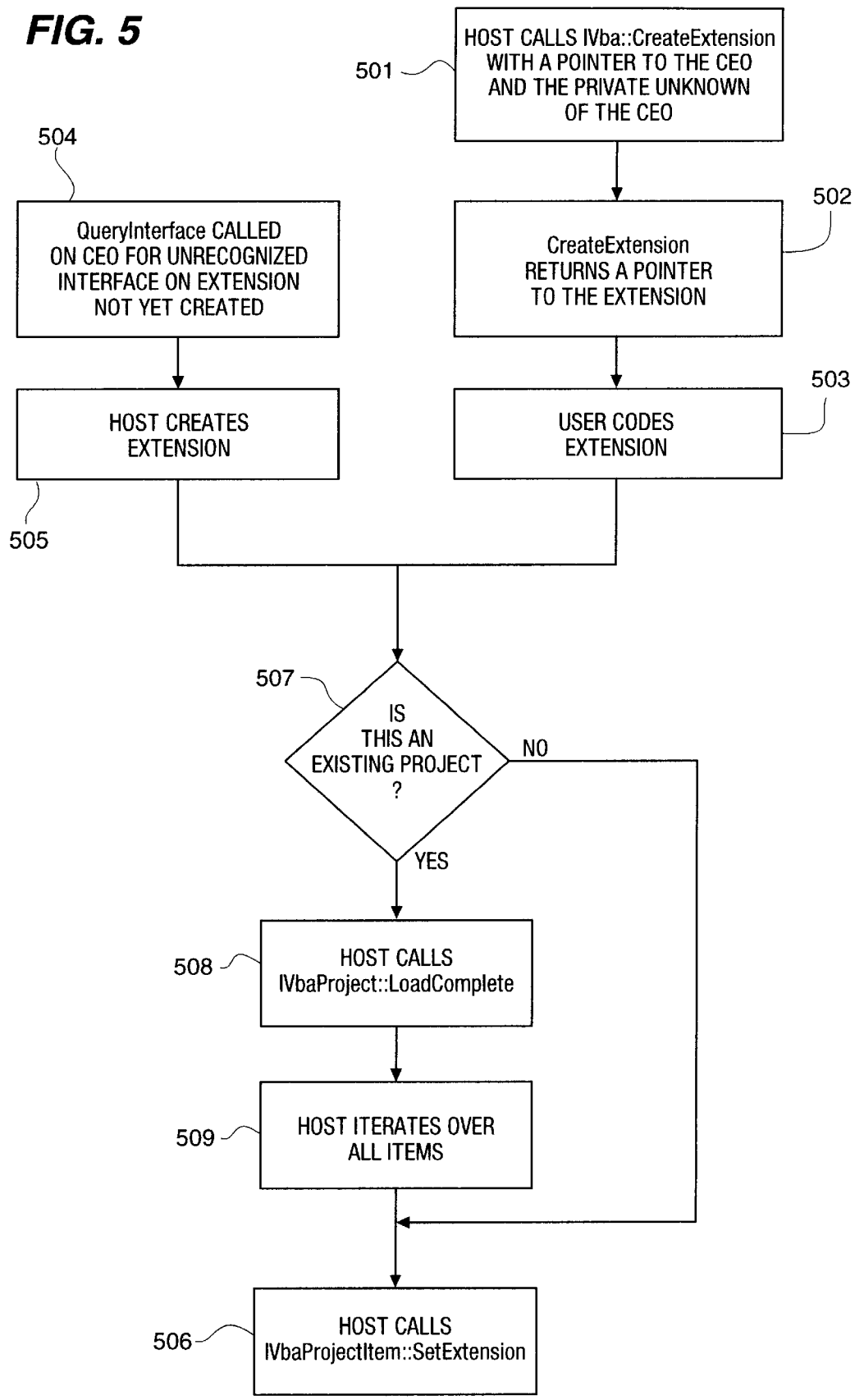
FIG. 5 illustrates in flow diagram form the steps taken by the present system for instance customization to create and set an extension in a document.

Each Controlling Extensible Object 21, Extensible Object 22 and Extension 23 trio are associated with a particular document project item. Creating the Extension 23 and associating that extension with its document project item is accomplished in two steps: creating the extension and setting the extension of the document project item. The flow diagram of FIG. 5 illustrates the steps implemented by the system for instance customization to perform these actions. To create the extension, the host calls IVba::CreateExtension at step 501 with a pointer to the Controlling Extensible Object 21 and a pointer to the private unknown of the Extensible Object 22. The Create Extension function returns a pointer to the Extension 23 at step 502 to identify the remaining element needed to implement the Controlling Extensible Object 21. At step 503, the user writes the code to implement the Extension 23. If, at step 504, QueryInterface is called on the Controlling Extensible Object 21 for an unrecognized interface that it would delegate to the Extension 23, and the Extension 23 associated with a Controlling Extensible Object 21 has not yet been created in step 503, the host must immediately create the Extension 23 at step 505 to be able to delegate the unrecognized interface. To set the Extension 23 of the document project item, the Extension 23 and the document project item must already have been created. The host then calls a method on VBA that is used to set the Extension 23 (IVbaProjectItem::SetExtension) at step 506 with a pointer to the Extension 23. In the case of loading an existing project as determined at step 507, the host should not call SetExtension until it has called IVbaProject::LoadComplete at step 508. Immediately after calling LoadComplete, the host should iterate at step 509 over all the document project items in the project and set the extensions for each. In the case of creating a new document project item, the host should call SetExtension at step 506 immediately after creating the new document project item.

Templates

A template is an instance of a Word document. When there is code in a document, the users can reuse the code in other instances of the document, which is accomplished in the template case by tying the code to the template to create a new template instance. Templates provide a limited form of inheritance. For example, a user can create a template document in Word then create a new document and set its template property to the template document. The new document inherits all the event handlers and methods (including event handlers of controls) of the template document. A user creates a template in a Word document that contains customization code and forms. A new document is created which uses this template. This new document inherits the behavior (event handlers and macros) of the template and further customization can be done to the document using instance customization.

Figure 4:
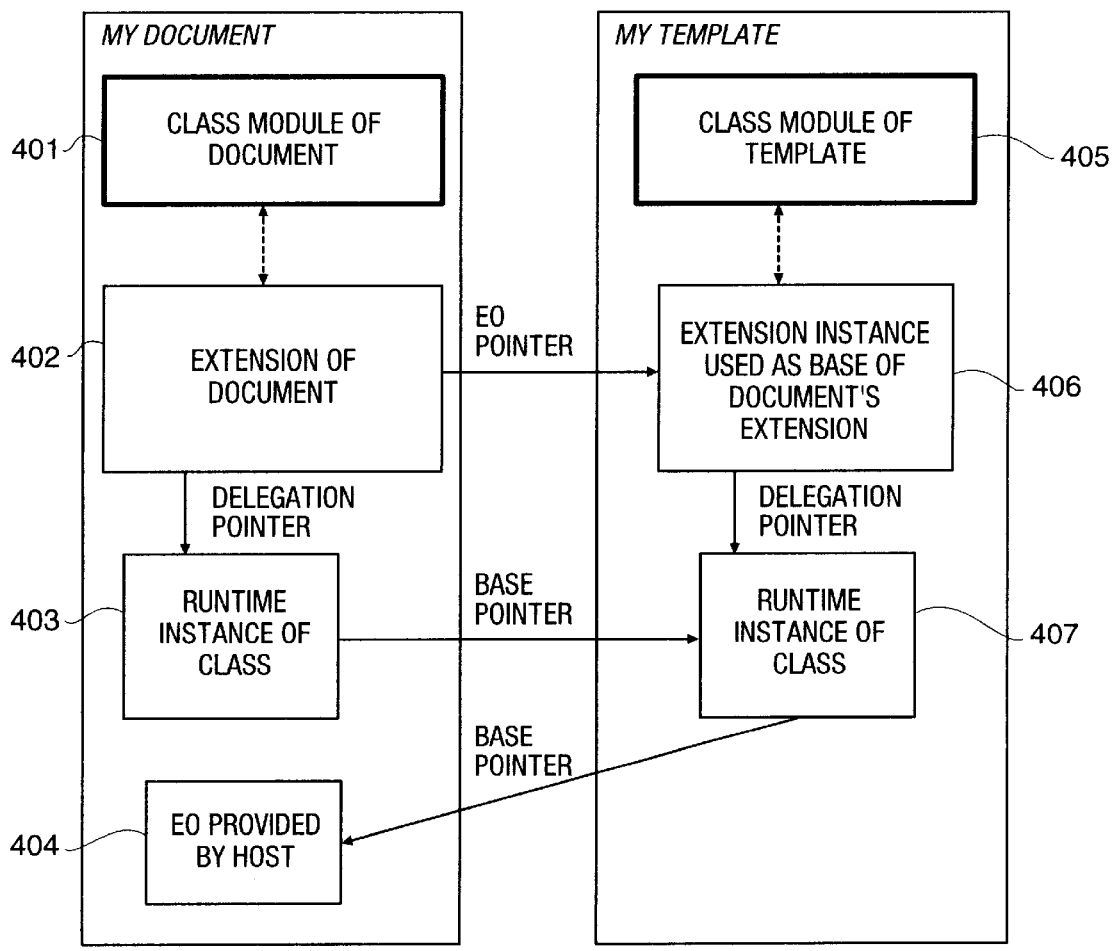
FIG. 4 illustrates the relationship between a document and a template during run-time in the present system for instance customization.

FIG. 4 illustrates the relationship between a document (MyDocument) and a template (MyTemplate) at runtime. The extension instance 406 of the template is treated as if it is the Extensible Object pointer of MyDocument. The extension instance 406 in MyTemplate uses the Extensible Object pointer of MyDocument as its Extensible Object 22. In addition, the class module 401 of MyDocument is compiled to a runtime instance of class 403 and the class module 405 of MyTemplate is compiled to a runtime instance of class 406. In this way, the behavior of the resulting object combines the behavior added by the extension 402 of MyDocument with the behavior added by the extension of the template with the base behavior of the Extensible Object 404 of MyDocument. When a new instance of a document is created based upon a template, then a copy is made of all the content of the document in the template and these copies are placed in the new document. This includes making a copy of each of the controls which were in the template document. The code that exists in the extension of the template is not copied, but rather is shared with the new document instance. The resulting contents and behavior of the new document is exactly the same as the template document from which it was created. Events that are fired from the document and from the controls contained in the document are handled by the code in the template. It is possible for a user to delete a control on a document which originated in a template. Since there may be references in the code of the template to the deleted control, an error is generated if any of these references is executed.

Summary

The system for instance customization functions to put code behind Office documents to thereby enable users to customize instances of objects that appear in an application program. Instance customization is enabled by the customized object aggregating the user provided code in a customizable object that is supplied by the Visual Basic for Applications layer. The Visual Basic for Applications object is given a pointer as part of the definition of the customized document object and comprises the element which implements the "base" functionality of the document object. Instance customization therefore seeks to combine a customizable object (termed "Extensible Object" herein) and a language engine object to form the customized instance.

What is claimed is:

1. In a computer system having an operating system, a language engine object and an application program having an instance with properties of an extensible object, a method for customization of the instance by adding compilable code to the application program, the method comprising the steps of:

executing said application program with said operating system;

aggregating an extension, the extension including the code, with the extensible object in a controlling extensible object corresponding to the application program to create a customized instance of the application program;

compiling the code added to the application program as part of the extension; and maintaining the identity of the extensible object while changing its behavior by introducing changes in its behavior through the extension.

2. The method of claim 1, wherein the step of aggregating includes the extension adding an interface to said extensible object.

3. The method of claim 2 wherein the step of aggregating includes the extension handling an event to provide a desired behavior to the instance of the application.

4. The method of claim 1 wherein the step of aggregating includes the extension adding a property, method or event to a default interface.

5. The method of claim 1 wherein the step of aggregating the extension subtracting a property, method or event from a default interface.

6. The method of claim 1 wherein the step of aggregating includes the extension tombstoning an interface.

7. The method of claim 1 wherein the step of aggregating includes the extension implementing IDispatch and IConnectionPointContainer in order to modify these interfaces as needed while further customizing the instance of the application.

8. The method of claim 1 further comprising the step of:
forwarding a query interface request to said extension when an unrecognized interface is requested of said controlling extensible object.

9. The method of claim 1 further comprising the steps of:
constructing a first template including the application and the code; and
allowing inheritance of the code used to customize the instance of the application in an other instance of the application using the first template.

10. The method of claim 1 further comprising the step of:
constructing a second template by further customizing the other instance of the application to generate a second template.

11. The method of claim 1 wherein said extension includes instructions for adding new interfaces to said extensible object.

12. The method of claim 1 wherein said extension includes instructions for adding new members and events to said extensible object.

13. The method of claim 1 wherein other references to the extensible object are not invalidated following customization by aggregation with the extension into the controlling extensible object.

14. A computer-readable storage medium containing computer executable instructions for carrying out the steps, in a computer system having an operating system, a language engine object and executing an application program having an instance with properties of an extensible object, of a method for customization of an instance of the application program by adding compilable code to the application program, the steps comprising: executing said application program with said operating system; aggregating an extension, the extension including the code, with the extensible object in a controlling extensible object corresponding to the application program to create a customized instance of the application program; compiling the code added to the application program as part of the extension; and
maintaining the identity of the extensible object while changing its behavior by introducing changes in its behavior through the extension.

15. The computer-readable storage medium of claim 14 further comprising computer executable instructions for the steps of constructing a first template including the application and the code; and allowing inheritance of the code used to customize the instance of the application in an other instance of the application using the first template.

16. The computer-readable storage medium of claim 15 further comprising computer executable instructions for the step of constructing a second template by further customizing the other instance of the application to generate a second template.

* * * * *

UNITED STATES PATENT AND TRADEMARK OFFICE
CERTIFICATE OF CORRECTION

PATENT NO.   : 6,108,661
DATED        : August 22, 2000
INVENTOR(S)  : Caron et al.

It is certified that error appears in the above-identified patent and that said Letters Patent is hereby corrected as shown below:

Column 7,
Line 6, "requirem" should read -- requirement --.

Signed and Sealed this

Twenty-fourth Day of February, 2004

JON W. DUDAS
*Acting Director of the United States Patent and Trademark Office*